(12) United States Patent
Spitsberg et al.

(10) Patent No.: US 6,558,814 B2
(45) Date of Patent: May 6, 2003

(54) LOW THERMAL CONDUCTIVITY THERMAL BARRIER COATING SYSTEM AND METHOD THEREFOR

(75) Inventors: Irene Spitsberg, Loveland, OH (US); Hongyu Wang, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/921,806

(22) Filed: Aug. 3, 2001

(65) Prior Publication Data

US 2003/0027012 A1 Feb. 6, 2003

(51) Int. Cl.[7] ............................. B32B 15/04; F03B 3/12
(52) U.S. Cl. ...................... 428/633; 428/632; 428/446; 428/469; 428/332; 428/655; 428/701; 428/702; 416/241 B
(58) Field of Search ................................. 428/632, 633, 428/650, 655, 670, 680, 323, 325, 329, 331, 332, 469, 697, 699, 701, 702, 446; 416/241 R, 241 B

(56) References Cited

U.S. PATENT DOCUMENTS 5,683,825 A * 11/1997 Bruce et al.
5,743,013 A * 4/1998 Taylor et al.
5,985,470 A    11/1999 Spitsberg et al.
6,007,926 A * 12/1999 Provenzano et al.
6,194,084 B1 *  2/2001 Wei et al.
6,413,578 B1 *  7/2002 Stowell et al.
6,444,355 B1    9/2002 Spitsberg et al.

* cited by examiner

*Primary Examiner*—Deborah Jones
*Assistant Examiner*—Jennifer McNeil
(74) *Attorney, Agent, or Firm*—David L. Narciso; Gary M. Hartman; Domenica N. S. Hartman

(57) ABSTRACT

A coating system having a low thermal conductivity, and a method by which the low thermal conductivity of the coating system is maintained through the development of cracks within a thermal-insulating layer of the coating system. The thermal-insulating layer is a mixture of two or more materials with different coefficients of thermal expansion (CTE). The materials of the thermal-insulating layer are selected and combined so that a low thermal conductivity is maintained for the coating system as the result of cracks developing and propagating from interfaces between the materials when the coating system is subjected to heating and cooling cycles.

17 Claims, 2 Drawing Sheets

LOW THERMAL CONDUCTIVITY THERMAL BARRIER COATING SYSTEM AND METHOD THEREFOR

STATEMENT REGARDING FEDERALLY SPONSORED RESEARCH

This invention was made with Government support under F33615-98-C-2893 awarded by the United States Department of the Air Force. The Government has certain rights in this invention.

CROSS REFERENCE TO RELATED APPLICATIONS

Not applicable.

BACKGROUND OF THE INVENTION

1. Field of the Invention

This invention relates to coating systems suitable for protecting components exposed to high-temperature environments, such as the hot gas flow path through a gas turbine engine. More particularly, this invention is directed to thermal barrier coating (TBC) systems and environmental barrier coating (EBC) systems characterized by a low coefficient of thermal conductivity, and a method by which multilayer TBC's and EBC's can be constructed to maintain a low thermal conductivity throughout numerous thermal cycles.

2. Description of the Related Art

Higher operating temperatures for gas turbine engines are continuously sought in order to increase their efficiency. However, as operating temperatures increase, the high temperature durability of the components of the engine must correspondingly increase. For this reason, the use of thermal barrier coatings (TBC) on components such as combustors, high pressure turbine (HPT) blades and vanes has increased in commercial as well as military gas turbine engines. The thermal insulation of a TBC enables components formed of superalloys and other high temperature materials to survive higher operating temperatures, increases component durability, and improves engine reliability.

TBC is typically a thermal-insulating ceramic material deposited on an environmentally-protective bond coat to form what is termed a TBC system. Bond coat materials widely used in TBC systems include oxidation-resistant overlay coatings such as MCrAlX (where M is iron, cobalt and/or nickel, and X is yttrium or another rare earth element), and oxidation-resistant diffusion coatings such as diffusion aluminides that contain aluminum intermetallics. Binary yttria-stabilized zirconia (YSZ) is widely used as the thermal insulating layer of TBC systems because of its high temperature capability, low thermal conductivity, and relative ease of deposition by air plasma spraying (APS), flame spraying and physical vapor deposition (PVD) techniques. TBC's formed by these methods have a lower thermal conductivity than a dense ceramic of the same composition as a result of the presence of microstructural defects and pores at and between grain boundaries of the TBC microstructure. TBC's employed in the highest temperature regions of gas turbine engines are often deposited by electron beam physical vapor deposition (EBPVD), which yields a columnar, strain-tolerant grain structure that is able to expand and contract without causing damaging stresses that lead to spallation. Similar columnar microstructures can be produced using other atomic and molecular vapor processes, such as sputtering (e.g., high and low pressure, standard or collimated plume), ion plasma deposition, and all forms of melting and evaporation deposition processes (e.g., cathodic arc, laser melting, etc.).

While significant advances in high temperature capabilities have been achieved through advancements in superalloy and TBC materials, alternative materials have been proposed. For example, materials containing silicon, such as those with silicon carbide (SiC) as a matrix material or a reinforcing material, are currently being considered for components used in high temperature applications, such as combustor and other hot section components of gas turbine engines. Similar to superalloy components, a thermal-insulating coating over the Si-containing material is often desirable or necessary to reduce the operating temperature and thermal gradient through the material. It is also often desirable or necessary to provide a coating that can provide environmental protection by inhibiting the major mechanism for degradation of silicon carbide in a corrosive environment, namely, the formation of volatile silicon monoxide (SiO) and silicon hydroxide ($Si(OH)_4$) products. Consequently, coatings for components formed of Si-containing materials often have a dual function, serving as a thermal barrier and simultaneously providing protection from the environment. Coating systems having this dual function will be referred to herein as an environmental barrier coating (EBC) system. Additional requirements of EBC systems for SiC-containing materials include low activity of silica ($SiO_2$) in its composition, a coefficient of thermal expansion (CTE) compatible with the SiC-containing material, low permeability for oxidants, and chemical compatibility with SiC and silica scale.

In order for a TBC or EBC to remain effective throughout the planned life cycle of the component it protects, it is important that the TBC or EBC has and maintains a low thermal conductivity throughout the life of the component, including high temperature excursions. However, the thermal conductivities of TBC and EBC materials such as YSZ are known to increase over time when subjected to the operating environment of a gas turbine engine. As a result, TBC's and EBC's for gas turbine engine components are often deposited to a greater thickness than would otherwise be necessary. Alternatively, internally cooled components such as blades and nozzles must be designed to have higher cooling flow. Both of these solutions are undesirable for reasons relating to cost, component life and engine efficiency.

In view of the above, it can be appreciated that further improvements in coating technology are desirable, particularly as TBC's and EBC's are employed to thermally insulate components intended for more demanding engine designs. A coating with lower thermal conductivity would allow for higher component surface temperatures or reduced coating thickness for the same surface temperature. Reduced coating thickness, especially in applications like combustors which require relatively thick TBC's and EBC's, would result in a significant cost reduction as well as weight benefit.

BRIEF SUMMARY OF THE INVENTION

The present invention provides a coating material having a low thermal conductivity, and a method by which the low thermal conductivity of the coating material is maintained through the intentional but controlled development of cracks within the coating material. According to a preferred aspect of the invention, the coating material serves as a thermal-insulating layer of a TBC or EBC, and is a mixture of two or more materials with different coefficients of thermal expansion (CTE). The materials of the thermal-insulating layer are selected and combined so that a low thermal conductivity is maintained as the result of microcracks developing and propagating from interfaces between the materials when the thermal-insulating layer is subjected to heating and cooling cycles. According to the invention, the thermal-insulating layer is formed so that the microcracks propagate in a direction transverse to the direction of heat transfer through the TBC/EBC, e.g., to the surface of the component, and form and are reformed in the thermal-insulating layer with each thermal cycle so that microcracks are continuously present in the thermal-insulating layer to provide a physical barrier to heat transfer to the component.

TBC's and EBC's in accordance with the present invention can have a significantly lower thermal conductivity than those of conventional YSZ, and are particularly suitable for thermally insulating components intended for demanding applications, including advanced gas turbine engines in which higher component surface temperatures are required. Alternatively, the lower thermal conductivity of the thermal-insulating layer allows for reduced coating thicknesses for the same surface temperature, resulting in a significant cost reduction as well as weight benefit.

Other objects and advantages of this invention will be better appreciated from the following detailed description.

DETAILED DESCRIPTION OF THE INVENTION

The present invention is generally applicable to components subjected to high temperatures, and particularly to components such as the high and low pressure turbine vanes (nozzles) and blades (buckets), shrouds, combustor liners and augmentor hardware of gas turbine engines. The invention provides TBC and EBC systems that are suitable for protecting the surfaces of gas turbine engine components that are subjected to hot combustion gases. While the advantages of this invention will be described with reference to gas turbine engine components, the teachings of the invention are generally applicable to any component on which a TBC or EBC may be used to protect the component from a high temperature environment.

Figure 1:
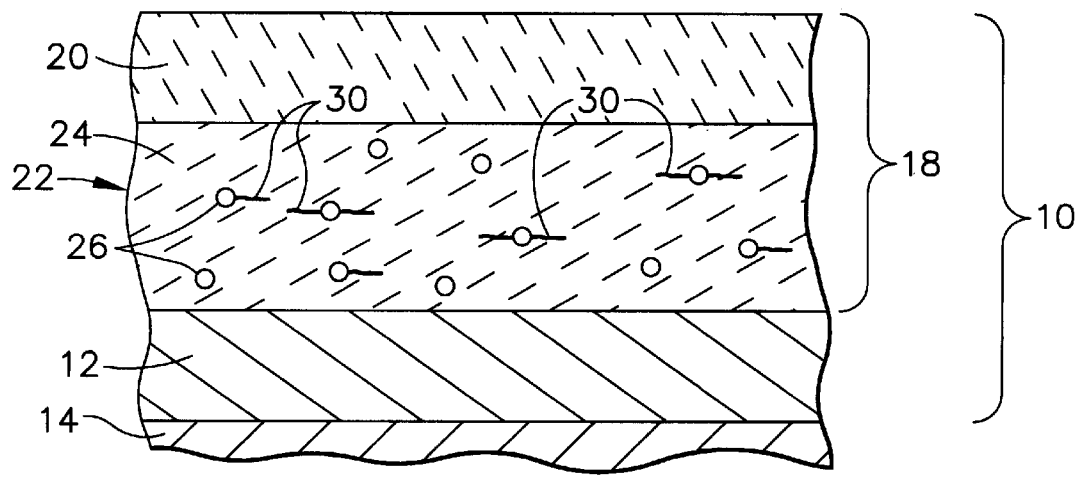
FIGS. 1 and 2 represent cross-sectional views of thermal barrier coating systems in accordance with two embodiments of the present invention.
Figure 2:
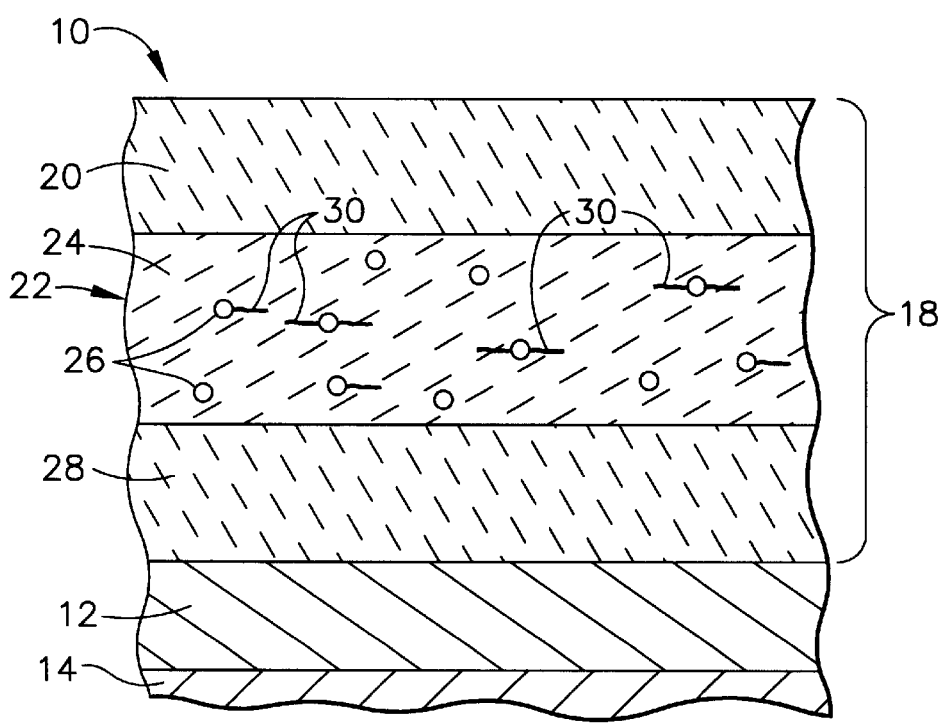
Figure 3:
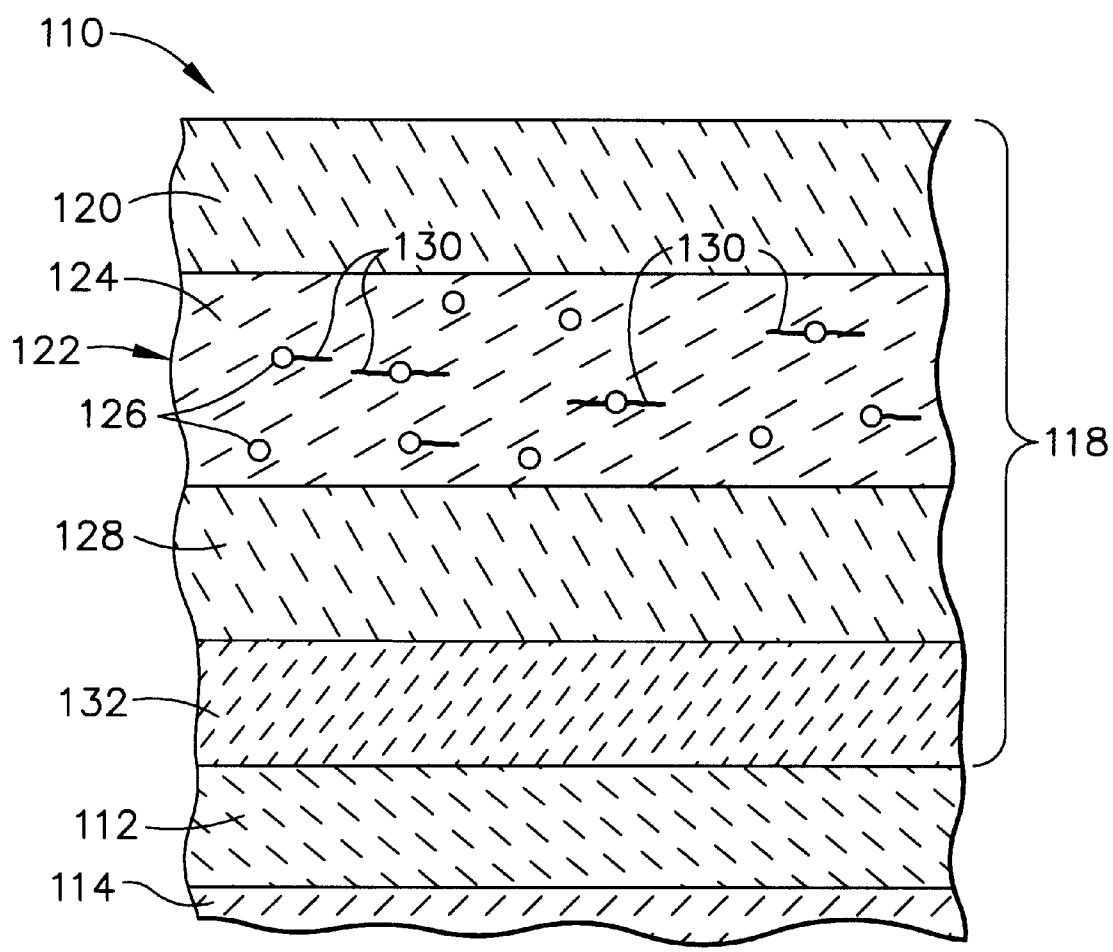
FIG. 3 represents a cross-sectional view of an environmental barrier coating system in accordance with a third embodiment of the present invention.

Two embodiments of a TBC system 10 in accordance with this invention are represented in FIGS. 1 and 2, while one embodiment of an EBC system 110 in accordance with this invention is represented in FIG. 3. The TBC system 10 of FIGS. 1 and 2 is shown as including a bond coat 12 that overlies the surface of a substrate 14, the latter of which may be a superalloy or another high temperature material. The substrate 14 is typically the base material of the component protected by the coating system 10, though the substrate 14 may instead be a coating on the component. The bond coat 12 may be an aluminum-rich composition of a type typically used with TBC systems for gas turbine engine components, such as an overlay coating of an MCrAlX alloy or a diffusion coating such as a diffusion aluminide or a diffusion platinum aluminide of a type known in the art. Aluminum-rich bond coats of this type develop an aluminum oxide (alumina) scale (not shown), which is thermally grown by oxidation of the bond coat 12.

Also shown in FIGS. 1 and 2 is a multilayer TBC 18 overlying the bond coat 12. The TBC 18 comprises an optional outer layer 20 overlying what will be referred to herein as a thermal-insulating layer 22. The embodiment of FIG. 2 further includes an optional intermediate layer 28 between the thermal-insulating layer 22 and the bond coat 12. The outer layer 20 is preferably formed of YSZ or another erosion-resistant material if the TBC 18 will be subjected to an erosive environment. The thermal-insulating layer 22 and the optional intermediate layer 28 will be discussed in greater detail below.

The EBC system 110 of FIG. 3 is shown as including a substrate 114, a bond coat 112, and a multilayer EBC 118. In contrast to FIGS. 1 and 2, the substrate 114 of FIG. 3 is a ceramic matrix composite (CMC), notable examples of which employ silicon carbide (SiC), silicon nitride ($Si_3N_4$) and/or silicon as both the reinforcement and matrix materials. For a silicon-containing substrate 114 (e.g., a CMC substrate containing SiC, $Si_3N_4$ and/or silicon), the bond coat 112 may be formed of mullite ($3Al_2O_3 \cdot 2SiO_2$) in accordance with U.S. Pat. No. 6,444,335, silicon in accordance with U.S. Pat. No. 6,299,988, barium strontium aluminosilicate (BSAS; ($Ba_{1-x}Sr_x$)O—$Al_2O_3$—$SiO_2$) in accordance with U.S. Pat. No. 5,985,470, or another suitable material.

Similar to the TBC system 10 of FIGS. 1 and 2, FIG. 3 shows the multilayer EBC 118 as including an optional outer layer 120 overlying a thermal-insulating layer 122. The EBC 118 is also shown as including a pair of intermediate layers 128 and 132 between the thermal-insulating layer 122 and the bond coat 112. As with the embodiments of FIGS. 1 and 2, if formed of YSZ or another erosion-resistant material, the outer layer 120 can be useful to improve the erosion resistance of the EBC 118 if exposed to an erosive environment.

The layers of the TBC and EBC systems 10 and 110 are only schematically represented in FIGS. 1 through 3. As known in the art, individual layers may have a strain-tolerant microstructure of columnar grains as a result of being deposited by a physical vapor deposition technique, such as EBPVD. The optional outer layers 20 and 120 particularly benefit from a columnar grain structure. As will be discussed in greater detail below, the thermal-insulating layers 22 and 122 of the TBC 18 and EBC 118, respectively, preferably have a noncolumnar structure as a result of being deposited by such methods as plasma spraying, including air plasma spraying (APS). Layers of this type are deposited in the form of molten "splats," resulting in a microstructure characterized by irregular flattened grains and a degree of inhomogeneity and porosity. In either case, the process by which the layers of the TBC 18 and EBC 118 are deposited provides microstructural defects and pores that are believed to decrease the thermal conductivity of the TBC and EBC systems 10 and 110.

The present invention provides a composition and structure for the thermal-insulating layers 22/122 that further reduce thermal conductivity as a result of being a mixture of two or more materials with different CTE's. These materials are selected and combined so that a low thermal conductivity is maintained for the thermal-insulating layer 22/122 as the result of cracks developing and propagating from interfaces between the materials when the thermal-insulating layer 22/122 is subjected to heating and cooling cycles. As seen in FIGS. 1, 2 and 3, the thermal-insulating layers 22 and 122 are shown as containing particles 26 or 126 dispersed in a matrix 24 or 124, respectively. According to the invention, different materials are used to form the matrix 24/124 and particles 26/126, and have CTE's that are sufficiently different to cause microcracks 30 and 130 to form in the thermal-insulating layer 22/122 when subjected to thermal cycling, for example, if the thermal-insulating layer 22/122 is heated to temperatures typical for hot gas path components of a gas turbine engine, and then cooled to room temperature. The magnitude of the thermal stress (σ) necessary to generate the microcracks 30/130 is directly proportional to the modulus (E) of the matrix 24/124, the CTE difference (Δα) between the materials of the matrix 24/124 and particles 26/126, and the temperature change (ΔT) that the thermal-insulating layer 22/122 is subjected to, according to the following equation:

$$\sigma = E \Delta \alpha \Delta T$$

When σ exceeds the tensile strength of the matrix 24/124, cracking will occur. Stated another way, when the temperature rise (ΔT) exceeds σ/EΔα, the microcracks 30/130 will develop.

In addition to the above, the thermal-insulating layer 22/122 must be formed so that the microcracks 30/130 are not so large as to cause spallation of the layer 22/122, and will propagate in directions transverse to the heat flux through the layer 22/122, which is typically in a direction perpendicular to the surface of the substrate 14/114. For this purpose, the particles 26/126 must also be of an appropriate size and orientation, and constitute a sufficient volume percent of the thermal-insulating layer 22/122.

While various material combinations are foreseeable for the matrix 24/124 and particles 26/126, particularly suitable combinations include a YSZ or alumina matrix 24/124 with particles 26/126 of BSAS, mullite, barium feldspar ($BaO.Al_2O_3.2SiO_2$), strontium feldspar ($SrO.Al_2O_3.2SiO_2$), calcium aluminates, aluminum titanates, zirconate phosphate materials (known as NZP-family materials) as represented by sodium zirconate phosphate ($NaZr_2P_3O_{12}$) and/or cordierite ($2MgO.2Al_2O_3.5SiO_2$). YSZ, alumina, BSAS and mullite are particularly suitable in combination, with CTE's of about 9.4, 7.8, 5.3 and 5.5 ppm/° C., respectively. As such, a YSZ or alumina matrix 24/124 combined with particles 26/126 of BSAS or mullite provides for a significant CTE mismatch, e.g., a minimum difference of about 40% comparing alumina to mullite. YSZ is a preferred material for the matrix 24/124 as a result of its erosion resistance and the ease with which it can be deposited by APS and other known deposition techniques. BSAS is particularly desirable for the particles 26/126 because it has a lower thermal conductivity (Tc) than YSZ and, similar to YSZ, is not volatile in water vapor at high temperatures.

The particles 26/126 preferably constitute at least about 5 volume percent of its thermal-insulating layer 22/122, and as much as about 50 volume percent of the layer 22/122. In addition, the particles 26/126 are preferably at least about 0.5 micrometer in diameter, and as large as about 50 micrometers in diameter in order to induce sufficient stresses during thermal cycling to develop the microcracks 30/130 at the interfaces between the particles 26/126 and matrix 24/124, yet not promote spallation. A suitable thickness for the thermal-insulating layers 22/122 will vary depending on the particular application, with thicknesses on the order of up to about 20 mils (about 500 micrometers) being possible for most applications.

In FIG. 2, the optional intermediate layer 28 between the thermal-insulating layer 22 and the bond coat 12 serves as a transition layer that compensates for the CTE mismatch between these layers. Preferred materials for the intermediate layer 28 will depend in part on the compositions of the bond coat 12, substrate 14 and thermal-insulating layer 22. A preferred material for the intermediate layer 28 is based on YSZ, a notable example of which contains about 6 to about 8 weight percent yttria, with the balance zirconia. Other zirconia-based ceramic materials could also be used with this invention, such as zirconia fully stabilized by yttria, nonstabilized zirconia, or zirconia partially or fully stabilized by ceria, magnesia, scandia and/or other oxides. According to one aspect of the invention, a particularly suitable material for the intermediate layer 28 is YSZ containing about 4 to about 8 weight percent yttria (4–8% YSZ). The intermediate layer 28 is preferably deposited to a thickness that will provide a suitable stress distribution within the TBC system 10 to promote the mechanical integrity of TBC 18. A suitable thickness for this purpose is generally on the order of about 3 to about 30 mils (about 75 to about 750 micrometers). Depending on CTE mismatch and the severity of the operating environment, the composition of the intermediate layer 28 can be uniform or have a gradual compositional change, e.g., from essentially all YSZ at the interface with the bond coat 12 to essentially the same composition as the thermal-insulating layer 22 at the interface between the layers 22 and 28. On the other hand, if the CTE mismatch or operating environment is not severe, the intermediate layer 28 can be omitted, as shown in FIG. 1.

In FIG. 3, the intermediate layers 128 and 132 between the thermal-insulating layer 122 and the bond coat 112 also serve as a CTE transition region to compensate for any CTE mismatch between these layers. If the particles 126 of the thermal-insulating layer 122 are formed of BSAS, a problem may arise if the bond coat 112 is formed of one of the silicon-containing bond coat materials described above. Silicon dioxide formed from oxidation of the silicon-containing bond coat 112 can react with the BSAS particles 126 at temperatures generally above about 1300° C., leading to the formation of silicate-type phases that would diminish the adhesion of the thermal-insulating layer 122. In this scenario, at least one of the intermediate layers 128 and 132 must also serve as an environmental barrier between the thermal-insulating layer 122 and the bond coat 112.

In a preferred embodiment, the intermediate layer 132 serves to adhere the other layers 128, 122 and 120 to the substrate 114, while also preventing interactions between any BSAS content within the layers 122 and 128 and the silicon content of the substrate 114 at high temperatures. Mullite is suitable as the a material for the intermediate layer 132 because of its chemical stability with Si-containing materials at high temperatures. The intermediate layer 132 may also contain BSAS (or even consist entirely of BSAS) for less demanding applications, e.g., temperatures below about 1300° C. The addition of BSAS to the layer 132 is also relatively compatible with Si-containing substrates 114 in terms of having a CTE of about 5.3 ppm/° C., as compared to a CTE of about 4.9 ppm/° C. for SiC/SiC CMC. If formed of a mixture of mullite and BSAS, a suitable thickness for the layer 132 is about 25 to about 250 μm (about 0.001 to about 0.010 inch), depending on the particular application.

The intermediate layer 128 preferably provides environmental and thermal protection to the underlying layer 132, bond coat 112 and substrate 114. A preferred material for the layer 128 is BSAS, which is capable of providing excellent environmental barrier to the layer 132 if formed to contain mullite, which would otherwise exhibit significant silica activity and volatilization if exposed to water vapor at high temperatures. In addition, BSAS is physically compliant with SiC-containing substrates, and is relatively compatible with mullite and silicon in terms of CTE. A suitable thickness range for the BSAS layer 128 is about 125 to about 500 μm (about 0.005 to about 0.020 inch), depending on the particular application.

An alternative to the use of the intermediate layers 128 and 132 entails forming the bond coat 112 of BSAS, whose CTE (about 5.3 ppm/° C.) is sufficiently near that of a SiC/SiC CMC substrate (about 4.9 ppm/° C.) to mitigate the CTE mismatch between the thermal-insulating layer 122 and the substrate 114. However, as noted above, a BSAS bond cost 112 can only be applied directly to a silicon-containing substrate 114 if the component will not sustain surface temperatures above about 1300° C. A suitable thickness for a BSAS bond coat 112 is generally on the order of about one to about ten mils (about 25 to about 250 micrometers).

Cracks that typically develop in coatings containing mixtures of materials are typically random, and therefore do not significantly contribute to reducing thermal conductivity. In accordance with the present invention, the microcracks 30/130 contribute to a lower thermal conductivity for the TBC 18 and EBC 118 because the thermal-insulating layers 22/122 are deposited to promote propagation of the microcracks 30/130 in directions parallel to the surface of the substrate 14/114. Specifically, the thermal-insulating layers 22/122 are deposited by plasma spraying or another process that causes the matrix 24/124 to comprise "splats" of irregular flattened grains, in which are dispersed the particles 26/126 that are also in the form of splats. Importantly, though grain growth, sintering and pore redistribution will occur within the TBC 18 and EBC 118 during sufficiently high temperature excursions (e.g., about 1300° C.), the microcracks 30/130 have the potential to reform or be replaced by new microcracks 30/130 with each heating and cooling cycle as a result of the significant CTE mismatch between the particles 26/126 and the matrix 24/124. As a result, a lower thermal conductivity can be expected to be maintained within the thermal-insulating layers 22/122 throughout any number of thermal cycles, and therefore throughout the life of the component it protects.

In an investigation leading to this invention, thermal-insulating coatings in accordance with the invention were deposited by air plasma spraying on substrates formed of a SiC/SiC CMC material. Each of the coatings used zirconia stabilized by about 7 weight percent yttria (7%YSZ) as the matrix material. A first group of the coatings was formed to have a dispersion of BSAS particles in the matrix, while a second group of coatings was formed to have a dispersion of mullite particles. Each substrate was provided with a bond coat of BSAS having a thickness of about 120 micrometers. The materials for the coatings were prepared from powders of 7%YSZ and either BSAS or mullite, which were mixed in 1:1 ratios and the resulting mixtures deposited to thicknesses of about 150 on the BSAS bond coats using spray parameters that included a deposition gun power level of about 40 kW and a stand-off distance of about five inches (about thirteen centimeters). The coatings were then thermally cycled fifty times between room temperature (about 25° C.) and about 2400° F. (about 1315° C.) at one hour cycles. Examination of the microstructures of the coatings revealed that thin (about 0.2 micrometers in width) cracks had developed at and propagated from the BSAS/YSZ and mullite/YSZ phase boundaries, which were defined by the splat interfaces of the plasma-sprayed coatings. These results evidenced that, though cracks would be expected to heal at the upper temperature, new cracks were forming when the coating was cooled as a result of the CTE mismatches between the YSZ matrix material and the BSAS and mullite particles.

While the invention has been described in terms of a preferred embodiment, it is apparent that other forms could be adopted by one skilled in the art. For example, it is foreseeable that various CTE-mismatched materials could be used for the matrix 24/124 and particles 26/126, as long as such materials are capable of developing microcracks substantially transverse to the direction of heat transfer through the coating systems 10 and 110. Furthermore, the outer layers 20 and 120 and/or the intermediate layers 28, 128 and 132 could be omitted from the coating systems 10 and 110. Therefore, the scope of the invention is to be limited only by the following claims.

What is claimed is:

1. A coating system on a surface of a component, the coating system comprising a thermal-insulating layer having a microstructure characterized by irregular flattened grains, the thermal-insulating layer comprising a matrix of a first material, particles of at least a second material dispersed in the matrix, and microcracks originating at interfaces between the particles and the matrix and emanating in directions substantially parallel to the surface of the component, the particles being of sufficient size and present in a sufficient amount and the first and second materials having sufficiently different coefficients of thermal expansion to develop the microcracks in the thermal-insulating layer when subjected to thermal cycling.

2. A coating system according to claim 1, wherein the first material is yttria-stabilized zirconia or alumina.

3. A coating system according to claim 1, wherein the second material is at least one material selected from the group consisting of barium strontium aluminosilicate, mullite, barium feldspar, strontium feldspar, a calcium aluminate, an aluminum titanate, a zirconate phosphate material, and cordierite.

4. A coating system according to claim 1, wherein the first material is yttria-stabilized zirconia and the second material is barium strontium aluminosilicate.

5. A coating system according to claim 1, further comprising an intermediate layer between the thermal-insulating layer and the surface of the component, the intermediate layer having a coefficient of thermal expansion between the coefficients of thermal expansion of the matrix and the component.

6. A coating system according to claim 5, wherein the intermediate layer is formed of at least one material selected from the group consisting of yttria-stabilized zirconia, mullite and barium strontium aluminosilicate.

7. A coating system according to claim 1, wherein the thermal-insulating layer is the outermost layer of the coating system.

8. A coating system according to claim 1, further comprising an outermost ceramic layer overlying the thermal-insulating layer.

9. A coating system according to claim 1, wherein the thermal-insulating layer is formed of splats so as to have the microstructure characterized by irregular flattened grains.

10. A coating system according to claim 1, wherein the particles are sized in a range of about 0.5 to about 50 micrometers in diameter and constitute about 5 to about 50 volume percent of the thermal-insulating layer.

11. A coating system according to claim 1, wherein the first material has a coefficient of thermal expansion that is at least 40% greater than that of the second material.

12. A coating system according to claim 1, wherein the component is formed of a material selected from the group consisting of superalloys and silicon-containing materials.

13. A coating system on a surface of a gas turbine engine component, the coating system comprising a bond coat and a multilayer barrier coating, the barrier coating comprising an intermediate layer on the bond coat and a thermal-insulating layer on the intermediate layer, the thermal-insulating layer comprising a matrix of yttria-stabilized zirconia and particles of barium strontium aluminosilicate and/or mullite dispersed in the matrix, the particles being of sufficient size and present in a sufficient amount to cause the formation of microcracks that originate at interfaces between the particles and the matrix and emanate in directions substantially parallel to the surface of the component, the matrix and the particles being formed of splats so that the thermal-insulating layer has a microstructure characterized by irregular flattened grains.

14. A coating system according to claim 13, wherein the particles are sized in a range of about 0.5 to about 50 micrometers in diameter and constitute about 5 to about 50 volume percent of the thermal-insulating layer.

15. A coating system according to claim 13, wherein the thermal-insulating layer is the outermost layer of the coating system.

16. A coating system according to claim 13, further comprising an outermost ceramic layer overlying the thermal-insulating layer.

17. A coating system according to claim 13, wherein the component is formed of a material selected from the group consisting of superalloys and ceramic matrix composite materials containing silicon or a silicon compound.

* * * * *